United States Patent
Steinbiss et al.

[11] Patent Number: 5,946,655
[45] Date of Patent: *Aug. 31, 1999

[54] METHOD OF RECOGNIZING A SEQUENCE OF WORDS AND DEVICE FOR CARRYING OUT THE METHOD

[75] Inventors: Volker Steinbiss; Bach-Hiep Tran; Hermann Ney, all of Aachen, Germany

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/413,051

[22] Filed: Mar. 29, 1995

[30] Foreign Application Priority Data

Apr. 14, 1994 [DE] Germany ............... 44 12 745

[51] Int. Cl.$^6$ ........................... G10L 5/02
[52] U.S. Cl. ............ 704/251; 704/236; 704/240; 704/242; 704/243; 704/256
[58] Field of Search ................... 395/2.45, 2.5, 395/2.51, 2.64, 2.65, 2.66; 704/236, 240, 242, 243, 251, 256

[56] References Cited

U.S. PATENT DOCUMENTS

| | | | |
|---|---|---|---|
| 4,759,068 | 7/1988 | Bahl et al. ............... | 381/43 |
| 5,388,183 | 2/1995 | Lynch ..................... | 395/2.51 |
| 5,465,317 | 11/1995 | Epstein ................... | 395/2.45 |
| 5,502,791 | 3/1996 | Nishimura et al. ........ | 395/2.65 |

FOREIGN PATENT DOCUMENTS 0533260  3/1993  European Pat. Off. .......... G10L 5/06

*Primary Examiner*—Fan S. Tsang
*Assistant Examiner*—Allan Hoosain

[57] ABSTRACT

When a language model is to be used for the recognition of a speech signal and the vocabulary is composed as a tree, the language model value cannot be taken into account before the word end. Customarily, after each word end the comparison with a tree root is started anew, be it with a score which has been increased by the language model value so that the threshold value for the scores at which hypotheses are terminated must be high and hence many, even unattractive hypotheses remain active for a prolonged period of time. In order to avoid this, in accordance with the invention a correction value is added to the score for at least a part of the nodes of the vocabulary tree; the sum of the correction values on the path to a word then may not be greater than the language model value for the relevant word. As a result, for each test signal the scores of all hypotheses are of a comparable order of magnitude. When a word end is reached, the sum of all added correction values is subtracted and the correct language model value is added.

8 Claims, 2 Drawing Sheets

METHOD OF RECOGNIZING A SEQUENCE OF WORDS AND DEVICE FOR CARRYING OUT THE METHOD

BACKGROUND OF THE INVENTION

The invention relates to a method of recognizing a sequence of words of a given vocabulary from a speech signal, comprising the following steps:

sampling of the speech signal at recurrent instants in order to produce a series of test signals;

executing a signal-by-signal comparison between the test signals and various series of reference signals, thus producing scores, each series of reference signals forming part of a predetermined set of series of reference signals and representing a word of the vocabulary, the set of series of reference signals constituting a tree which has a root and in which each tree branch comprises a number of reference signals and is associated with a speech element, vocabulary words being associated with given branch nodes and branch ends;

deriving, for each terminated word, a word result which comprises an overall score, the comparison producing scores being continued, starting with a new score corresponding to the overall score of the terminated word as the predecessor word, for subsequent test signals with the start of series of reference signals for as long as the score is smaller than a predetermined threshold value, the overall score of the terminated word being derived from the score at the end of this word and a language model value which is associated with a combination of the terminated word and a sequence of predetermined length of terminated predecessor words;

recognizing of at least one sequence of words on the basis of the overall scores.

The invention also relates to a device for carrying out this method.

A method of this kind is known from EP 0 533 260 and serves for the recognition of coherently pronounced speech with a large vocabulary. Because the comparisons with the root of the vocabulary tree start anew each time when a word end is reached, very many states are active within the tree. This will become evident when each comparison newly starting at the tree root is represented as a copy of the vocabulary tree. This holds the more so when separate tree copies are composed for simultaneously terminating words when complex language models are used. Each distinct path through each tree then represents an instantaneous hypothesis. In order to reduce the number of active hypotheses, the scores of the hypotheses are compared with a threshold value which is preferably formed by the optimum score at the current instant, increased by a given range of values, and all hypotheses having a score exceeding said threshold value are not continued.

For a further reduction of the search space, i.e. the number of active hypotheses, moreover, use is made of a language model which takes into account the probabilities of word sequences or at least the individual probabilities of the words per se. However, when the vocabulary is composed as a tree, the language model value can be determined only after termination of a word. The continuation of a hypothesis after a word end then takes place with an abruptly increased score, so that the threshold value with which the scores are compared must be chosen so as to be sufficiently high. As a result, however, many hypotheses remain active within the individual words or the tree copies; these hypotheses exceed the relevant valid threshold value only after a word end has been reached, due to addition of the language model value, so that they are terminated.

SUMMARY OF THE INVENTION

Therefore, it is an object of the invention to provide a method of the kind set forth which enables the use of a more favourable threshold value for the scores, and hence a reduction of the number of active hypotheses, without significantly degrading the reliability of recognition.

This object is achieved in accordance with the invention in that upon continuation of the comparisons after a word end the score for at least the tree root is increased by a correction value and that whenever a word end is reached, this correction value is subtracted from the score at the relevant word end and the language model value is added so as to produce the overall score.

The basic idea of the invention is to take into account at least partly the language model value, which can be determined only at the end of a word, already at the word beginning, so that the scores of the individual hypotheses do not exhibit large jumps at word boundaries and all scores of the hypotheses occur with a practical, similar magnitude at any instant. As a result, the threshold value with which the scores of the individual hypotheses are compared, or the range between the optimum score and the threshold value, can be kept smaller, so that unfavourable hypotheses can be terminated sooner.

The correction value should not be larger than the language model value of the most favourable word which can succeed the relevant location in the tree at which the correction value was added. As a result, when only a single correction value is used at the tree root, this correction value can only be small. In that case some hypotheses which later terminate in words of low probability are nevertheless continued. Consequently, taking into account a correction value exclusively at the beginning of each tree copy offers a limited advantage only. Therefore, a version of the method in accordance with the invention is characterized in that for at least some of the tree nodes succeeding the tree root the instantaneous score is increased by a correction value associated with the relevant tree node, and that when a word end is reached, the sum of the correction values of all tree nodes passed so as to reach the relevant word end is subtracted and the language model value is added so as to produce the overall score. The best approximation of the actual language model value, of course, is obtained when for each tree node a corresponding correction value is added, which is succeeded exclusively by words with a larger language model value; however, this requires a substantial processing effort which may outweigh the saving achieved by a substantial reduction of the number of unattractive hypotheses. A suitable compromise consists in that, for example, correction values are added only up to the second or the third tree node after the tree root.

When several correction values are used at successive tree nodes, it is necessary to ensure that the score thus increased does not become greater than for the word which is most attractive in relation to the language model and which can terminate subsequent to this series of tree nodes. Therefore, a further version of the method in accordance with the invention is characterized in that the sum of the correction values of all tree nodes between the tree root and each word does not exceed the language model value for the relevant word.

The correction value or values can be determined in various ways. The correct language model value is very well approximated in a further version of the invention in that the correction value, or each correction value, is derived from the minimum value of the language model values occurring for all words succeeding the relevant tree node. For each optimum word that can be reached from a given point within the tree the associated language model value is thus added just when this word is reached. However, according to this solution each correction value must be separately determined for each tree copy.

Another possibility consists in that the correction values associated with the tree nodes are fixed, predetermined values which are preferably determined, for each tree node, from the words succeeding the relevant tree node and, in the case of an n-gram language model with n>1, from the optimum predecessor words in conformity with the language model used. The correction values can then be permanently stored, for example even in the memory for the reference signals or in a memory driven in parallel therewith. Because the optimum correction values need be determined only once prior to the execution of the method of the invention, it is worthwhile to determine these correction values as well as possible with a greater effort. However, when such permanently associated correction values are used, the actual predecessor words are not considered for the individual tree copies. This version can also be simplified by deriving the correction values from the individual unigram language model values of the individual words.

Finally, the two possibilities for determining the correction values can also be combined by determining the correction values at tree nodes only for given, predetermined words of the vocabulary, in dependence on these words, and by using, for all other words of the vocabulary, predetermined correction values which are permanently associated with the tree nodes. This is because it has been found that given predecessor words have a particularly strong effect on the language model values, whereas for the other predecessor words the language model values arising therefrom are similar. As a result, the latter method already provides quite favourable correction values.

A natural speech signal always contains speech intervals, even though they are often very brief. In order to take into account such speech intervals, it is known for the set of series of reference signals to comprise at least one interval reference signal associated with a speech interval. In this case after a word end preferably no correction value is added upon comparison of a test signal with an interval reference signal. Speech intervals are thus quasi-privileged, preventing an abrupt increase of the number of hypotheses because a speech interval deviates from all speech elements of the vocabulary tree and hence slight differences occur in the scores of the individual hypotheses, so that it is practically impossible to recognize many hypotheses as being unfavourable so that they should be terminated.

A device for carrying out the described method in accordance with the invention comprises means for picking up an acoustic speech signal and for generating a series of test signals therefrom, means for storing series of reference signals which correspond to words of a vocabulary, means for storing language model values, first means for comparing the series of test signals with series of reference signals and for producing scores and overall scores, second means for comparing the scores with a threshold value and for controlling the first means for comparison, means which are controlled at least by the first means for comparison in order to output at least one sequence of words, and is characterized in that it comprises means for delivering correction values to the first means for comparison.

BRIEF DESCRIPTION OF THE DRAWINGS

Embodiments of the invention will be described in detail hereinafter with reference to the drawing, wherein.

DESCRIPTION OF THE PREFERRED EMBODIMENTS

Figure 1:
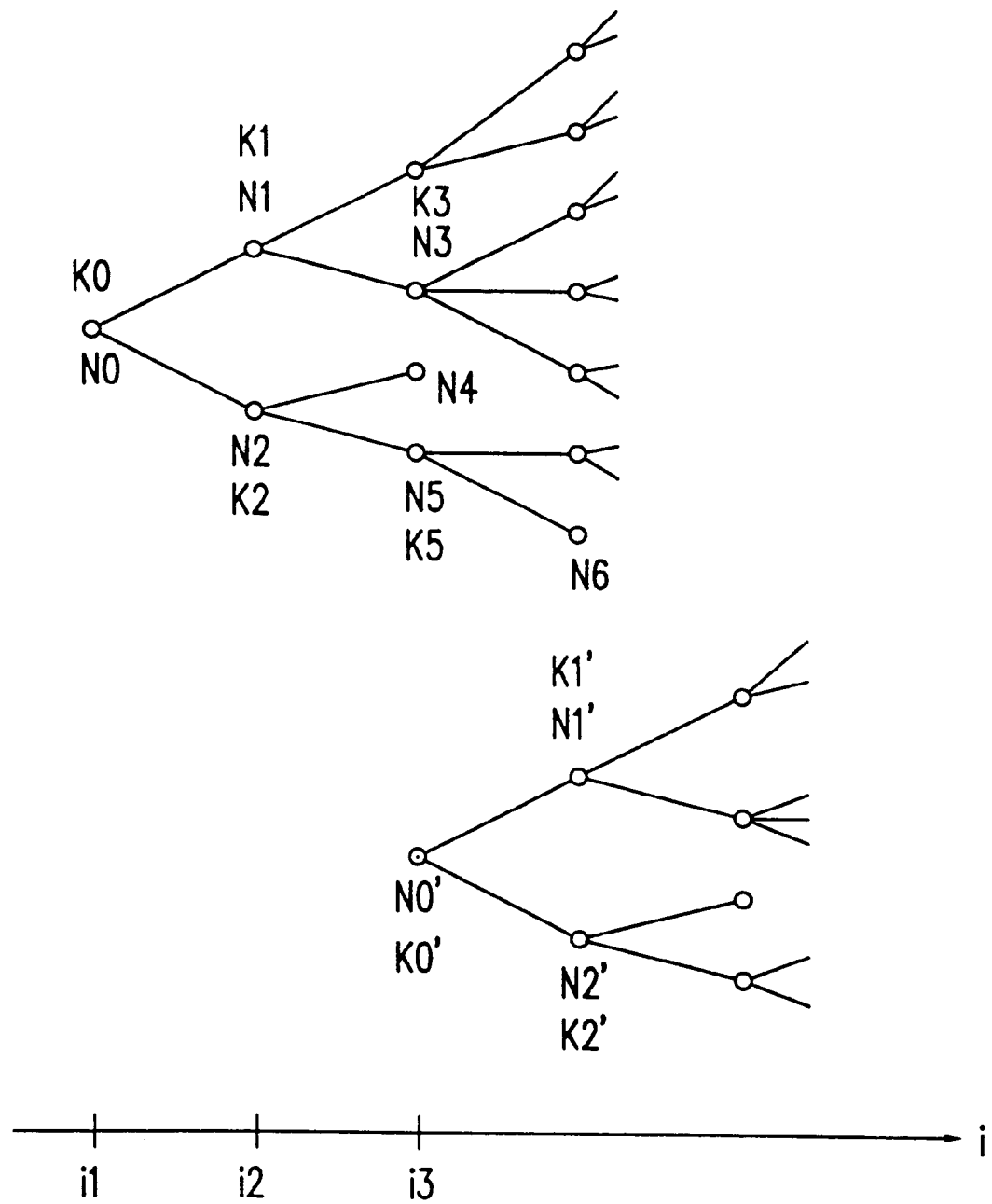
FIG. 1 shows diagrammatically a diagram with two offset tree copies.

For the following description it is assumed that the vocabulary is composed as a tree. Such a tree consists of nodes and edges which connect these nodes as is shown in FIG. 1; for the time being only the upper tree which actually represents merely the start of a vocabulary tree will be considered. From the node N0, representing the tree root, two edges extend to the nodes N1 and N2 which themselves are branched to further nodes, the nodes N3 to N5 being indicated. Each edge from one node to the next stands for a speech element which is represented by a number of successive reference signals. At least two edges extend from each node (three edges from the node N3), i.e. each speech element terminating in a node can be succeeded by several, different speech elements. However, no edges extend from the node N4; this node N4 thus constitutes a word end. Other word ends, however, may also be present in nodes wherefrom further edges extend. It is to be noted that the vocabulary tree is depicted in a very simple manner and that a vocabulary tree for real speech contains many more nodes in each plane and hence a correspondingly larger number of edges extending therefrom.

A series of test signals derived from a speech signal is then compared with essentially successive reference signals. In FIG. 1 a temporal sequence of test signals i is assumed, some of the test signals being characterized in more detail. For the test signal i1 it is assumed that previously a word end was reached and that now the comparison with the first reference signals of the vocabulary tree commences again. Diagrammatically this can be considered as if in the tree shown at the top in FIG. 1 the edges in the i axis are followed in parallel. This is not completely true, because on some edges some reference signals can also be associated with several successive test signals and moreover, for successive test signals some reference signals within the series of reference signals on an edge can also be skipped; however, for the sake of simplicity these cases will not be considered hereinafter. The test signals succeeding the test signal i1 are thus compared with the reference signals of the two edges originating from the tree root N0; upon the test signal i2 these two series of reference signals, represented by the edges, are terminated by the nodes N1 and N2 and the subsequent test signals are compared with the series of reference signals corresponding to the edges originating from the nodes N1 and N2.

Upon the test signal i3 inter alia the word end corresponding to the node N4 is reached and the associated score has increased to a given value which is determined by the preceding words and the sum of the comparison results of the test signals i1 to i3 and the reference signals between the tree root N0 and the node N4. Before the comparison with the beginning of the vocabulary tree is started again after the word end at the node N4, indicated by the beginning of the lower tree in FIG. 1, a language model value is added to the score at the word end, which language model value is dependent on the relevant word and on a number of predecessor words, depending on the language model used. As a result, at the end of this word an overall score is formed and the new start of the comparisons with the beginning of the vocabulary tree commences with a score equal to said overall score.

However, at the same time the comparisons with the upper tree are continued with the test signals succeeding i3, i.e. with the reference signals corresponding to the edges originating from the nodes N3, N5 etc. For example, when it is assumed that approximately the same scores were obtained for the nodes N4 and N5, the scores on the edges originating from the node N5 will at least initially be substantially smaller than on the edges of the new tree originating from the tree root N0', because a language model value has been added to the latter. If premature termination of the hypotheses from the tree node N0', due to exceeding of the instantaneous threshold value, is to be prevented, this threshold value which is derived from the best score at any instant must be sufficiently higher than said best score, i.e. a large range of scores must be permitted. However, in the upper tree many hypotheses are still continued even though they are substantially inferior to the best hypothesis in this tree, so that the search space, i.e. the overall number of active hypotheses, becomes unnecessarily large.

In order to avoid this effect, correction values are added during the comparison of the test signals with the reference signals in correspondence with the individual edges at the nodes, i.e. at the transitions from one speech element to the next. The effect of the correction value K0 added to the tree root N0 slightly deviates from that of the other correction values as will be explained hereinafter. At the node N1 a correction value K1 is added to the score reached at this node, and at the node N2 a correction value K2 is added. Similarly, at the nodes N3 and N5 a correction value K3 and K5, respectively, is added. At the node N4, representing a word end, no correction value is added, but instead the sum of all correction values added thus far on the path to this word end is subtracted, after which the correct language model value is added. Thus, at the node N4 first the sum K0+K2 is subtracted. After addition of the correct language model value, therefore, the original score, or overall score, at this area has been reached again and the tree root N0' is started with the same score as in the absence of correction values. At the same time, however, for the comparisons starting, for example from the node N5 the scores have been increased by the sum K0+K2+K5, so that they are of the same order of magnitude as the scores emanating from the tree root N0'. As a result, these scores are more comparable and the threshold value for terminating a hypothesis can hence be chosen nearer to the optimum score at that instant. It will be evident that the number of active hypotheses is thus reduced, without increasing the risk of termination of a hypothesis which would have proved to be superior in the further course of the speech signal.

It also appears from the foregoing that the sum of the correction values added at all nodes on the path to a word end should not be larger than the language model of this word. For example, the sum K0+K2 should not be larger than the language model value of the word ending at the node N4. Similarly, the sum K0+K2+K5 should not be larger than the word ending at the node N6 if a word end is assumed to occur at this node. In principle this also holds for word ends which terminate at a node with outgoing edges within the tree, because there are many words which at the same time represent the starting part of a longer word.

The effect of the correction value K0 at the tree root N0 consists in that it produces at least one reference signal which does not form part of the vocabulary tree but is associated with a speech interval. When such a speech interval occurs in a speech signal at the end of a word, the test signal derived therefrom will suitably correspond to the interval reference signal, but not to the first reference signals behind the tree root for which, therefore, give rise to unattractive scores which become even less attractive due to the previously added correction value K0, so that the corresponding hypotheses are very quickly terminated. This is because no correction value is added for the interval reference signal, so that the associated score remains comparatively favourable.

Optimum correction values can be determined as follows. First of all, for each node in the tree with which a word end is associated the minimum language model value is determined for all word ends which can be reached from the relevant node. For nodes in the tree which represent only a word end and wherefrom no further edges emerge, this is the language model value of said ending word itself; however, in the case of nodes within the tree this is not necessarily so, because the language model value at such a node within the tree may be larger than the language model value for feasible word extensions. Thus, when a word end is approached via the preceding sequence of nodes commencing at the tree root, the values associated with the nodes become larger or remain the same. The minimum value of all values associated with an arbitrary node is then assigned to the tree root as a correction value, and each node is then assigned a correction value consisting of the difference between its associated value and that of the preceding node. In that case the sum of all correction values on each path to a word end will not exceed the language model value for the relevant word end.

When the actual sequence of predecessor words is taken into account for the estimation of the language model values for each node in the tree in which a word end is present, in dependence upon the language model used the correction values must be continuously calculated anew. However, it is also possible to use fixed correction values; for each word end within the tree the optimum predecessor word or the optimum sequence of predecessor words is then used, irrespective of the actual predecessor words at any instant. Consequently, smaller correction values are usually obtained, so that the search space cannot be optimally reduced; however, these correction values can be determined in advance and permanently assigned to the individual nodes of the vocabulary tree. Thus, no arithmetical operations are required for these correction values during the recognition process. For the determination of the correction values in dependence on predecessor words, use can also be made of a language model which is simpler than that wherefrom the correct language model values are derived. In a border case the unigram language model value can be assigned to each word end. It is alternatively possible to determine the correction values only for given predetermined predecessor words and in dependence thereon, whereas for the other words fixed, predetermined values are used. This is because most words result in very similar language model values, whereas only few given words produce language model values which substantially deviate therefrom. A further simplification also consists in that correction values are not assigned to all nodes, but only to the first node which directly succeeds the tree root or also to the subsequent node, because only small correction values were assigned to the more remote nodes.

The simplest possibility consists in assigning a correction value only to the tree root; however, this correction value then has merely the effect described for speech intervals.

Figure 2:
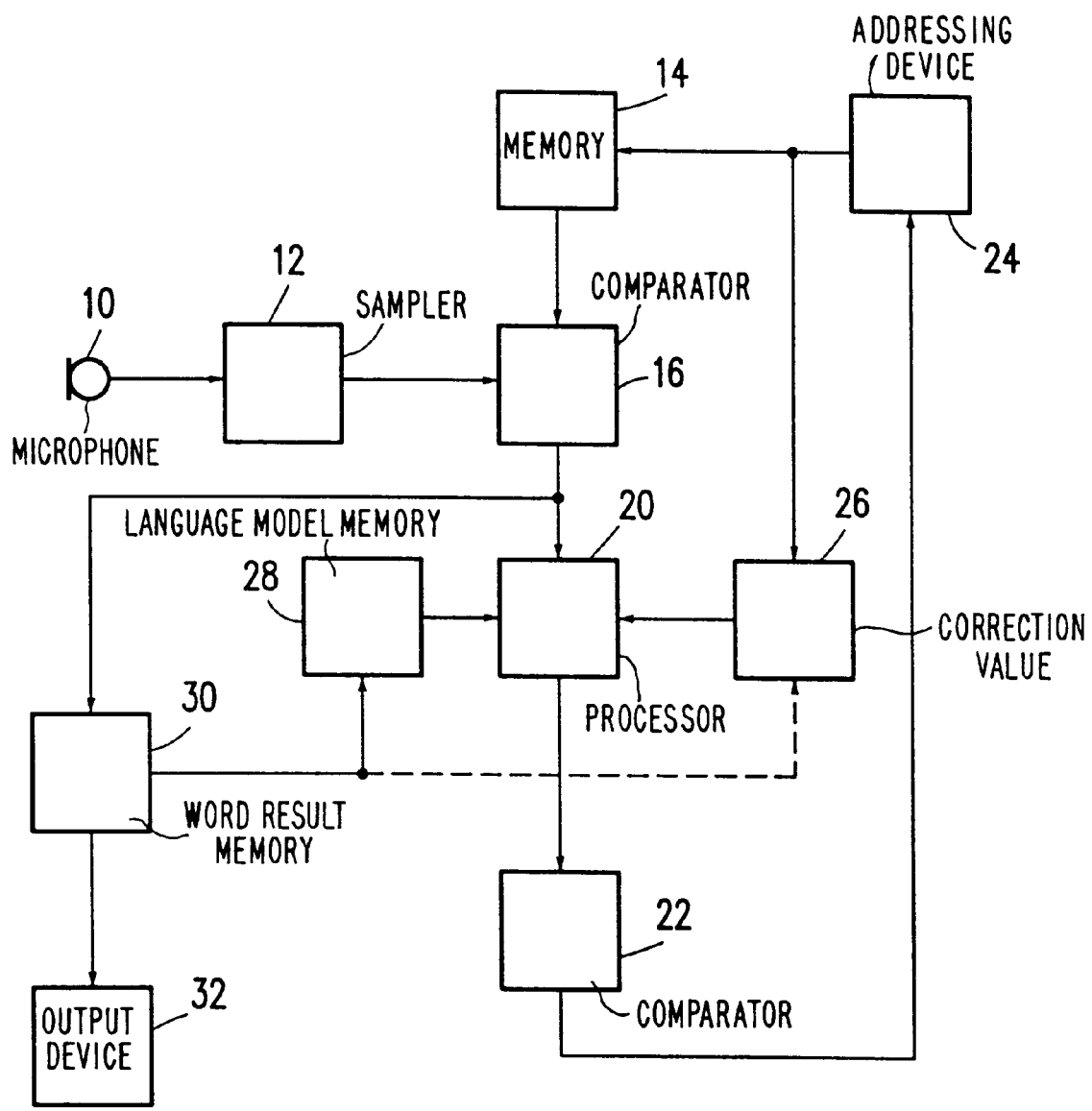
FIG. 2 shows a block diagram of a device in accordance with the invention.

The device which is shown in the form of a block diagram in FIG. 2 is similar to known devices as far as its essential parts are concerned. Via a microphone 10 an acoustic speech signal is picked up and converted into an electric signal which is sampled, preferably at regular instants, in block 12 so as to be converted into a series of test signals. Each test signal characterizes a time segment of the speech signal, for example a segment having a duration of 10 ms, over a plurality of parameters, and in block 16 these test signals are compared with reference signals from a memory 14 so as to determine distance values. This comparison is customarily performed according to the dynamic programming method. The memory 14 stores the reference values as series comprising a respective number of reference values, each series corresponding to a speech sound, for example a phoneme. The stored reference signals are fetched by an addressing device 24 so as to be applied to the comparator 16.

In block 20 the comparison results are processed, notably summed over series of reference signals and the results are at least temporarily buffered. Furthermore, at the ends of the series of reference signals, corresponding to a node in the vocabulary tree, correction values supplied by a device 26 are added, provided that the relevant node does not represent a word end. The correction values are determined from the indication of the relevant node which is determined from the address by the addressing device 24, i.e. it is read from a memory in the simplest case involving fixed correction values, or is calculated by means of the predecessor words supplied by a word result memory 30. For each word end reached, i.e. when the reference signal currently read from the memory 14 is the last one of a word, the word result memory 30 receives the indications associated with the relevant word, notably the word identity, as well as references to predecessor words. Moreover, for each word end in the block 20 the sum of the previously added correction values is subtracted and a language model value derived from a language model memory 28 is added. The latter memory is also driven by the predecessor words from the word result memory 30.

The data derived in the block 20 by the comparison of the test signals with reference signals are applied to a further comparator 22 in which the score for each series of reference signals is compared with a threshold value which is preferably derived from the minimum score for each test signal. The addressing device 24 is activated only when the score is more attractive than the threshold value, the addressing device then reading the next reference signals to be compared with the next test signal.

The word memory 30 may be succeeded by a further processing device which is not shown herein and which, in the case of a plurality of word sequences produced in the word memory 30, selects preferably the word sequence of highest probability and applies it to an output device 32, for example a display screen or a printer.

The foregoing description is based on the assumption that the scores are represented by the sum of comparison results which indicate notably the negative logarithms of the state probabilities for the individual comparison; accordingly, correction values and language model values are also added. In another representation of the comparison results, for example in the case of indication of the direct probability values, the corresponding values should be multiplied. However, this does not affect the principle of the invention.

We claim:

1. A method of processing a sequential group of test signals corresponding to a portion of a speech signal that has been sampled at periodic intervals to produce a series of test signals for the purpose of recognizing a sequence of words from the speech signal, comprising the steps of:

a) accessing a stored set of series of reference signals, the set of series of reference signals constituting a tree having a root and branches, each branch corresponding to a subseries of reference signals and associated with a speech element, each series of reference signals extending from the root and representing a word of a vocabulary, vocabulary words being associated with certain branch nodes and branch ends of the tree;

b) executing a signal-by-signal comparison between the group of test signals and at least one of the series of reference signals of the tree in order to identify a terminated word, each comparison between a test signal in the group and a reference signal producing a comparison score;

c) associating an overall score with each series of reference signals, the overall score being derived from a language model value which is associated with a sequence of prior terminated words, the comparison scores and a correction value that at least in part reflects the transition from the prior terminated words to the root of the tree;

d) continuing the signal-by-signal processing where the overall score does not exceed the threshold;

e) subtracting the correction value from the overall score and adding a language model value to the overall score when a word end is reached for a separate comparison of the test signals, the language model value reflecting the transition between the predecessor words and the root of the tree; and f) continuing the processing where the overall score does not exceed a threshold.

2. A method as claimed in claim 1, characterized in that for at least some of the tree nodes succeeding the tree root the instantaneous score is increased by a correction value associated with to the relevant tree node, and that when a word end is reached, the sum of the correction values of all tree nodes passed so as to reach the relevant word end is subtracted and the language model value is added so as to produce the overall score.

3. A method as claimed in claim 2, characterized in that the sum of the correction values of all tree nodes between the tree root and each word end does not exceed the language model value for the relevant word.

4. A method as claimed in claim 2, characterized in that the correction value, or each correction value, is derived from the minimum value of the language model values occurring for all words succeeding the relevant tree node.

5. A method as claimed in claim 2, characterized in that the correction values associated with the tree nodes are fixed, predetermined values which are preferably determined, for each tree node, from the words succeeding the relevant tree node and, in the case of an n-gram language model with n>1, from the optimum predecessor words in conformity with the language model used.

6. A method as claimed in claim 2, characterized in that the correction values at tree nodes are determined only for given, predetermined words of the vocabulary in dependence on these words, and that predetermined correction values which are permanently associated with the tree nodes are used for all other words of the vocabulary.

7. A method as claimed in claim 1, in which the set of series of reference signals comprises at least one interval reference signal associated with a speech interval, characterized in that after a word end no correction value is added upon comparison of a test signal with an interval reference signal.

8. A device for carrying out the method claimed in claim 1 comprising means for picking up an acoustic speech signal and for generating a series of test signals therefrom, means for storing series of reference signals which correspond to words of a vocabulary;

means for storing language model values;

first means for comparing the series of test signals with series of reference signals and for producing scores and overall scores;

second means for comparing the scores with a threshold value and for controlling the first means for comparison, means which are controlled at least by the first means for comparison in order to output at least one sequence of words, characterized in that it comprises means for delivering correction values to the first means for comparison.

* * * * *